United States Patent
Anerousis et al.

(10) Patent No.: US 6,393,472 B1
(45) Date of Patent: May 21, 2002

(54) AUTOMATIC AGGREGATION OF NETWORK MANAGEMENT INFORMATION IN SPATIAL, TEMPORAL AND FUNCTIONAL FORMS

(75) Inventors: Nikolaos Anerousis, New York, NY (US); Alexandros Biliris, Chatham, NJ (US); Hosagrahar Visvesvaraya Jagadish, Ann Arbor, MI (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/207,975

(22) Filed: Dec. 9, 1998

Related U.S. Application Data

(60) Provisional application No. 60/069,007, filed on Dec. 10, 1997, and provisional application No. 60/069,024, filed on Dec. 10, 1997.

(51) Int. Cl.[7] .............................................. G06F 15/173
(52) U.S. Cl. ........................ 709/223; 709/223; 709/228
(58) Field of Search ................................ 709/220, 221, 709/222, 223, 224, 200, 219, 203; 370/392, 258

(56) References Cited

U.S. PATENT DOCUMENTS

| | | | |
|---|---|---|---|
| 5,509,123 A | 4/1996 | Dobbins et al. ............. 709/243 |
| 5,511,190 A | 4/1996 | Sharma et al. ................. 707/1 |
| 5,511,191 A | 4/1996 | de Leeuw van Weenen et al. ....... 707/100 |
| 5,513,343 A | 4/1996 | Sakano et al. ............... 709/200 |
| 5,517,645 A | 5/1996 | Stutz et al. .................... 707/10 |
| 5,535,335 A | 7/1996 | Cox et al. .................... 709/203 |
| 5,600,632 A | 2/1997 | Schulman .................... 709/220 |
| 5,659,543 A | 8/1997 | Ater et al. ................... 370/258 |
| 5,778,182 A | 7/1998 | Cathey et al. .............. 709/219 |
| 5,781,735 A | 7/1998 | Southard ..................... 709/224 |
| 5,794,246 A | 8/1998 | Sankaran et al. ........... 707/101 |
| 5,796,951 A | 8/1998 | Hamner et al. ............. 709/223 |
| 5,799,073 A | 8/1998 | Fleischer, III et al. .. 379/112.01 |
| 5,812,130 A | 9/1998 | Van Huben et al. ........ 345/764 |
| 5,819,279 A | 10/1998 | Togawa ..................... 707/103 |
| 5,819,284 A | 10/1998 | Farber et al. ............... 709/203 |
| 5,856,974 A * | 1/1999 | Gervais et al. ............. 370/392 |
| 5,872,928 A * | 2/1999 | Lewis et al. ................. 709/222 |
| 5,889,953 A * | 3/1999 | Thebaut et al. ............. 709/221 |
| 6,041,347 A * | 3/2000 | Harsham et al. ............ 709/220 |

* cited by examiner

Primary Examiner—David Wiley
Assistant Examiner—Khanh Quang Dinh

(57) ABSTRACT

A method and apparatus provide for the automatic aggregation of network management information in spatial, temporal and functional forms. Management information relating to a network is automatically aggregated by computational means in the form of a attribute name-value pair which is stored in an Aggregation Managed Object (AMO). The aggregation of network management information in the form of an AMO supports the spatial, temporal and functional aggregations. The AMOs themselves are stored in a database of a special management agent, the Management Aggregation and Visualization Server (MAVS) which allows network managers to access and set network information to and from the different aggregation forms.

28 Claims, 6 Drawing Sheets

AUTOMATIC AGGREGATION OF NETWORK MANAGEMENT INFORMATION IN SPATIAL, TEMPORAL AND FUNCTIONAL FORMS

PRIOR PROVISIONAL PATENT APPLICATION

The present application claims the benefit of U.S. Provisional Application No. 60/069,007 filed Dec. 10, 1997, now abandoned.

CROSS-REFERENCE TO RELATED APPLICATION

The present application is related to U.S. Patent Application Ser. No. 09/208,162 pending, filed Dec. 9,1998, entitled "AUTOMATIC VISUALIZATION OF MANAGED OBJECTS OVER THE WORLD-WIDE-WEB", and which is based on U.S. Provisional Application No. 60/069,024 filed Dec. 10, 1997.

BACKGROUND OF THE INVENTION

1. Field of the Invention

The present invention relates to the automatic aggregation of network management information in spatial, temporal and functional forms, and more particularly, to the use of an Aggregation Managed Object (AMO) in which to store attribute name-value pairs to support spatial, temporal and functional management information aggregation.

2. Description of the Art

The main challenges in providing powerful and comprehensive network management services for today's integrated networks lie in three main areas: how to provide support for heterogeneity (components of different types from different manufacturers), scalability (large numbers of network elements), and easy access to network management services (aggregation and visualization of management information).

The first challenge, heterogeneity, is being addressed through standardization efforts within organizations such as the IETF and the Network Management Forum. Today, a number of specifications are available for managing TCP/IP stacks (MIB-2 and RMON), ATM switches, etc.

There are, however, no widely established methods for dealing with the second challenge, that is with the large numbers of network elements (scalability). Managing large networks requires powerful abstractions that capture the essentials of the state of the network rather than the details. Most approaches for reducing state and event information in commercially available network management (NM) platforms are ad-hoc and usually customized for a particular management problem or network. As networks grow larger and integrate an ever increasing number of services, the existence of a scalable network management architecture becomes critical.

The first generation of network management tools to face the challenge of the large numbers of network elements (scalability), such as HP Openview, Sun Net Manager, IBM Netview, etc., follow closely the point-to-point management model. According to this model, a network management application (NM client) connects to a management agent (NM server) using one of the standard protocols for management such as SNMP or CMIP. The agent. contains information about a network element or a group of elements. A network manager retrieves or controls this information by issuing "get" and "set" operations. Especially in SNMP systems that do not support rich data types, this exchange of management information is at a very low level. As a result, all the intelligence for providing more complex NM services resides within the client (manager). First generation tools are therefore characterized by complex and expensive clients. Although these clients have the capability to maintain a hierarchical topology map and thereby provide easier navigation through a possibly large network, the manager still has to employ a low level management protocol to interact with every network element. First generation systems offer few capabilities to customize the available management services beyond the functionality offered by the underlying NM protocol such as SNMP or CMIP, or the interface provided by a vendor supplied element management system.

Second generation NM systems have tried to address some limitations of the first generation by providing better customization options and automation of routine management applications. Tools such as Tivoli's TME 10, CA's Unicenter TNG and NetExpert are targeted at the corporate IT infrastructure and offer a richer set of management services including end-to-end application management, network services management, software distribution etc.

Although the above tools simplify, to a large extent, the effort required to manage large numbers of network elements and applications, they are customized to work with specific products and network protocols. Fundamentally, the network manager has little control over what management services are presented to him/her and how information is aggregated, stored and visualized.

The third challenge then, a related area that has received much attention recently, is the one of access to network management services by the manager (aggregation and visualization of management information). Large network management systems collect a tremendous amount of information from network elements and make it available to network operators in a myriad of formats. In order for this information to convey the essence rather than the details of network state, it must be organized, summarized and simplified as much as possible. Similarly, the network manager needs mechanisms that aggregate the control of a large number of network elements into simpler interfaces.

Traditionally, network management systems have employed proprietary user interfaces to monitor and control a network state. Such systems are often customized for the specific management problem at hand and then used by a small group of appropriately trained people. This has been an acceptable solution while the only users of network management services were a small number of network operators. This situation, however, is changing rapidly: the Internet is reaching an increasing number of people and businesses every day, and broadband access is coming soon to every home. A large number of networked services are available today for businesses and consumers, ranging from simple dial-up network access to virtual networking, financial services such as online trading and banking, one step shopping, etc. The increasing complexity of online services of every form has introduced significant management requirements on both service providers and subscribers. Service providers have realized that the bundling of customer management services can be an important differentiator for their products. More customers today require the ability to observe the operational state of their service in real-time, collect statistics on service usage, customize parameters of the service, order additional service or perform proactive management tasks in anticipation of efforts. By delegating some aspects of managing a service to customers, operators can cut down on their customer care costs while providing competitive and cost effective services.

The increasing availability of management services has motivated many researchers to rethink the way these services are provided to consumers. The continuation of the existing status quo which calls for customized and complex user interfaces to service management functions receives increasing resistance from businesses and consumers that favor portable, lightweight, standards-based solutions that need the minimum amount of configuration and are simple to use. Many researchers have proposed to use the World-Wide Web (WWW) to provide access to management services. The Web offers the widest possible installed base of compatible clients (every networked computer is now equipped with a Web browser) and a portable execution environment based on Java that allows Web clients to access arbitrarily complex information services by downloading the appropriate Java applets.

Access to the management services has thus been provided using the World-Wide Web and Java, the most widely available tools today for remote information access. A resulting software platform for such access was named Marvel (for Management AggRegation and Visualization Environment) which is detailed in the reference "MARVEL: A Toolkit for building Scalable Web-based Management Services", and which is hereby incorporated by reference. Marvel is a software environment that allows the network manager to define how management information collected from network elements is aggregated into more useful abstractions and finally presented to the manager. Marvel thus provides scalable solutions for systems management for small businesses and large enterprises, network management services for network operators, and customer network management services for businesses and consumers.

The MARVEL architecture consists of lightweight clients and a hierarchy of Management Aggregation and Visualization Servers (MAVS). The minimum requirement for a MARVEL client is to have a Java Runtime Environment (JRE). All the necessary code to access management services provided by AMOs can be downloaded in real-time from the MAVS. In addition, if the client has the capability to display the Hypertext Markup Language (HTML) it can use the visualization features provided by the MAVS that aggregate attribute specific user interfaces (applets) on HTML pages. This is why Web browsers are the ideal MARVEL clients. In addition, the MARVEL architecture benefits from the fact that Web browsers are very widespread. By making the minimum number of assumptions for the client, MARVEL provides network management services of arbitrary complexity to practically every user on the Internet.

SUMMARY OF THE INVENTION

Accordingly, the present invention, which can use the Marvel platform (which in one embodiment uses a Java-enable Web Browser), provides a management information model that allows the aggregation of management information to reduce complexity, and further provides a distributed object services model (based on the MAVS described below) that allows the definition of rich data types and management services and the storage of management information in a distributed database of aggregated information.

Through the management information model, the network manager can define how management information, collected from network elements, is aggregated into more useful abstractions and finally presented. Aggregation of the information can be accomplished in spatial, temporal and functional forms. To allow for aggregations, network elements are grouped according to a specified criteria, and an aggregation rule specifying what information is sought is applied to the group. On the basis of the aggregation rule, attribute values of the network elements are retrieved and a filter function is applied. The filter function determines a current value of the attribute across all of the network elements to which the aggregation rule is applied. The current value of the attribute is then stored in an Aggregation Managed Object (AMO).

Through the distributed object services model the AMO can be stored, retrieved and automatically visualized over a distributed computing environment such as the world-wide-web. Each AMO contains a list of attributes which corresponds to network management information aggregated according to the aggregation rule. To visualize the information contained within the AMO, a web browser contacts the distributed object services model (having an HTTP server) which in turn creates an HTML page on the basis of the attributes contained within the AMO. Some of the attributes contained within the AMO are pointers which point to Java applets stored in an applet database. The Java applets are retrieved and inserted into the HTML page for viewing.

The present invention, including its features and advantages, will become more apparent from the following a detailed description with reference to the accompanying drawings.

DETAILED DESCRIPTION

FIGS. 1 through 7 illustrate a method and apparatus for providing a management information model and a distributed object services model. The models allow for the automatic aggregation of network management information in spatial, temporal and functional forms, and the automatic visualization of managed objects over the world-wide-web. Network management information is aggregated in the form of at least one attribute name-value pair and stored in an Aggregation Managed Object (AMO). The AMO is likewise stored in the database of a special management agent, the Management Aggregation and Visualization Server (MAVS)

which allows a network manager to access network information stored in the AMOs.

For the purposes of the present invention, the following methods of aggregation are distinguished:

Spatial aggregation, where information is collected from a number of components and a summarization function (filter) is applied. For example, the ingress traffic to a network region can be computed by summing traffic information collected from switches at the border of the region.

Temporal aggregation, where information is collected periodically to form a time series of various granularities (minutes, hours, etc.) or, for example, provide an autocorrelation measurement.

Functional aggregation, where information from different functional areas of a management system is combined to construct a functional view of a network element or service. A subscriber's profile that contains the subscriber billing information, CPE hardware configuration, performance measurements, etc., is an example of functionally aggregated information.

a. The Network Element Grouping Model

The main difficulty behind creating aggregations is the need to specify and maintain a (possibly) long list of components over which the aggregation is computed. Sometimes different aggregations are computed over the same group of components (which share a set of commonalities such as location, functionality, etc.) and for this reason a network element grouping model can be beneficial to reducing the overall amount of information required to specify aggregations.

Figure 1:
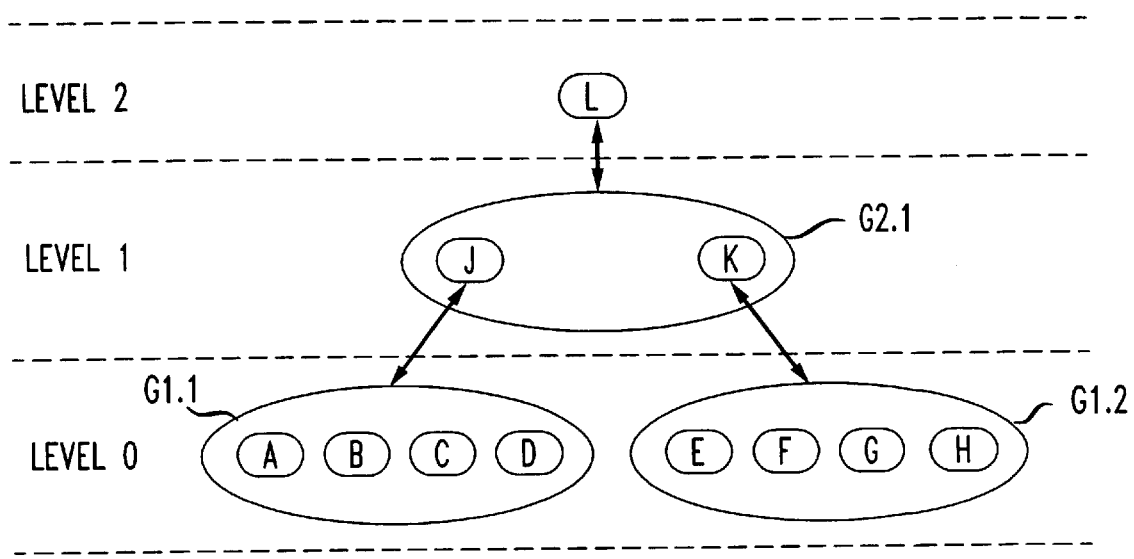
FIG. 1 illustrates an example of a group hierarchy in a network with 8 managed elements A to H, according to an embodiment of the present invention.
Figure 2:
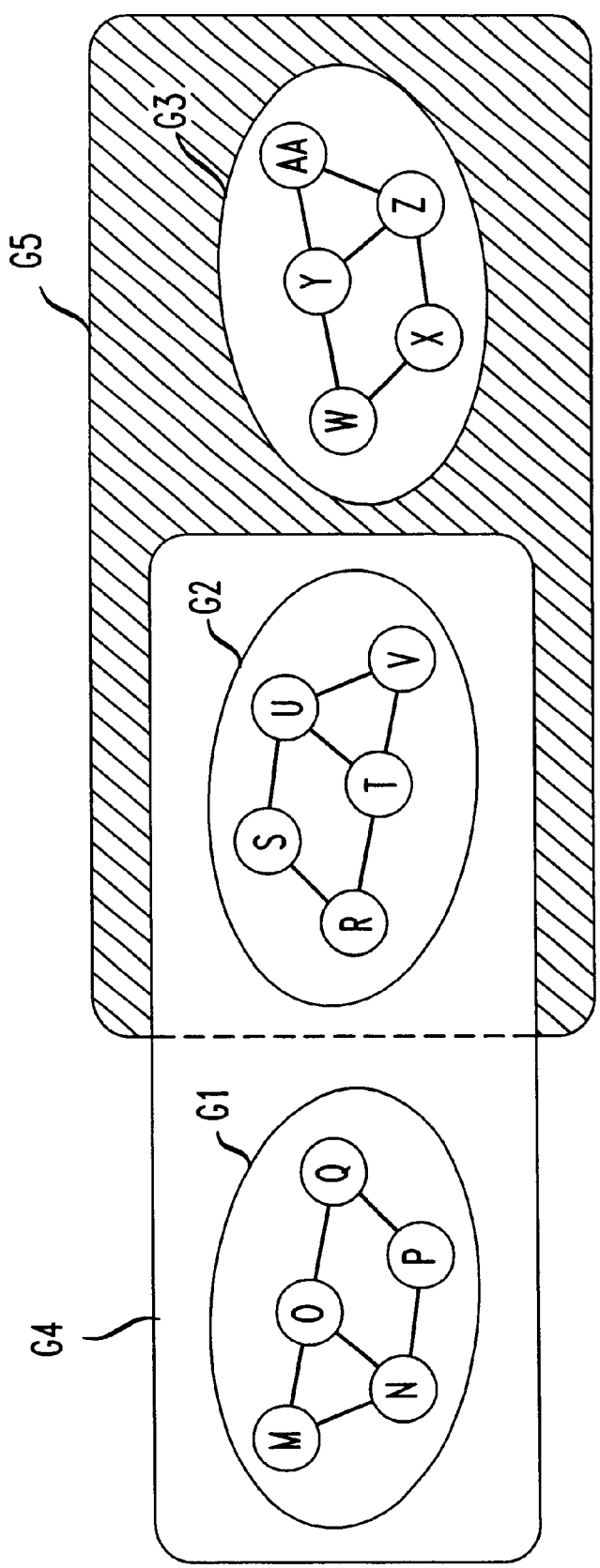
FIG. 2 illustrates an example where network elements are organized into different groups according to various levels of aggregation, according to an embodiment of the present invention.

According to the network element grouping model, and referring to FIGS. 1 and 2, the network consists of a number of interconnected network elements (NEs). Network elements are physical devices such as routers, printers, workstations, etc. Usually, the manufacturer of each of these elements provides an element management agent (EMA)—a rudimentary facility to manage (monitor and control) one or more instances of their equipment in a network.

Collections of the network elements are defined as groups. Users can dynamically define groups based on any factor that makes sense. For example, groups can be formed according to geographical or location criteria (e.g., a group of all NEs in a building, campus, state, etc.), or functionality (e.g., a group of all ATM switches), or some combination such as all ATM switches in the New York City area.

It is also possible to define a group with other groups as members. Thus, every network grouping hierarchy forms a tree with leaves being network elements. Groups are not necessarily disjoint. Every group is characterized by a level indicator that corresponds to the depth of the tree where the particular group belongs. Level 0 is reserved for the leaves of a hierarchy which (from a network management standpoint) represent the element management agents. A group at Level 1 corresponds to a set of element management agents. A group at Level 2 may contain groups of Level 1 and perhaps one or more EMAs (contained in Level 0). In general, a group at level n is allowed to contain groups of any level lower than n, i.e., level n-1, n-2, . . . , level 0 inclusive. Some times it is convenient to refer to a group of Level 0 which, however, really implies an element management agent (or at least one network element).

For example, FIG. 1 demonstrates an example of a network with 8 managed elements A through H. Each one of these elements A through H contains an EMA. Two groups of four elements each, G1.1 and G1.2 have been created. Information for these groups is stored in objects J and K, respectively, which are in turn stored in a special management agent (i.e., the MAVS, explained in further detail below). Furthermore, a second level group G2.1 can be created which consists of the management agent(s) that contain objects J and K. Information about this group is stored in object L. L's attributes are computed from the attributes of objects J and K, which in turn, are computed respectively from attributes in network elements A–D and E–H.

A group can be a point of aggregation of information about its subordinates. For example, FIG. 2 demonstrates an example where network elements M through Z and AA (of a Level 0 origin) are first organized into groups G1, G2 and G3 that compose the first level of aggregation. Group G4 is defined as the union of G1 and G2, and similarly G5 as the union of G2 and G3. Once the group hierarchy has been defined, the manager can define higher-level management views and services by referring to groups rather than individual network elements. As the simplest example, assume that an attribute "ErrorCount" is defined on some EMAs, representing the number of unrecognized packets arriving at the corresponding network element. A new attribute "ErrorCount" can be defined in a managed object representing G1 to represent the total number of errored packets received within the group. The latter can be computed by summing the "ErrorCount" attributes retrieved from every member of G1.

In general, attributes defined using groups of level n are computed by expanding these groups recursively to a list of management agents. The appropriate information is collected from each one of these agents to compute the attribute's value. Similarly, control operations on an attribute are performed by expanding the group definition into a set of management agents and performing a control operation on each one of these agents.

b. The Information Model

Management information in a large network today is usually distributed between the management information databases of network elements and, as a consequence, represents small aspects of the configuration or operation of those elements rather than of the network as a whole. Network managers, and the management applications they use today, require access to a much higher level of management information and services. The present invention thus uses an object-oriented information model where the value of an object's attribute can be defined as an arbitrary computation over other attribute values of other objects. Attribute values can be information residing inside element management agents or other computed attributes. The emphasis of the model is in providing a technology-independent specification framework in which these computations can be described. Using this model, the network manager can define new managed objects that represent computed views (i.e., aggregations) of network management information. Computed views can represent a summary of lower level configuration and performance information, or a more detailed view of a particular management parameter.

Figure 3:
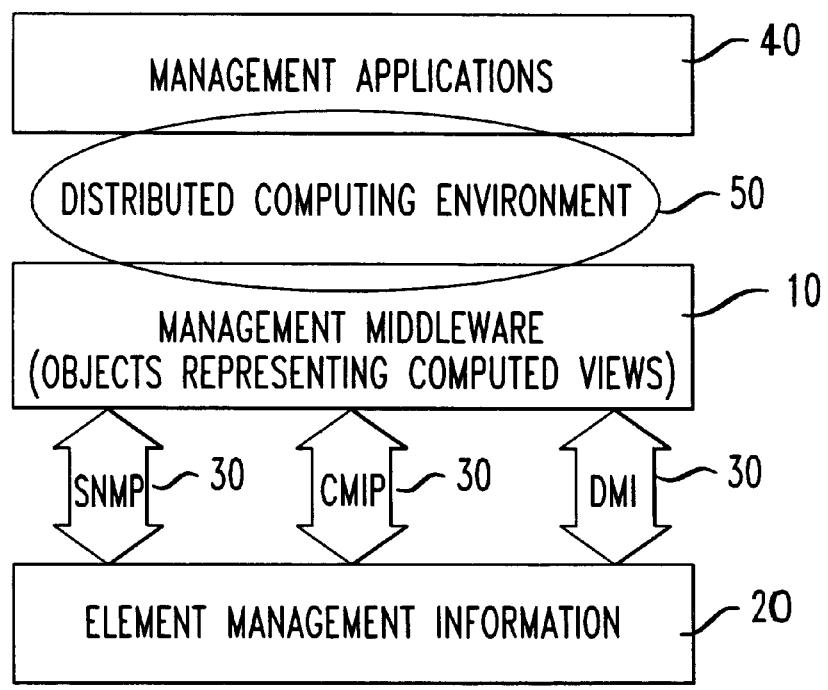
FIG. 3 illustrates a 3-level architecture for generating computed views of management information, according to an embodiment of the present invention.

Referring to FIG. 3, objects (such as objects J, K and L of Levels 1 and 2 shown in FIG. 1) representing computed views of network management information can be regarded as implementing a "middleware management services" layer 10. This layer 10 extracts information from managed elements 20 (such as elements A through Z and AA of Level 0 as shown in FIGS. 1 and 2) using a standards-based management protocol 30 (e.g., SNMP, CMIP or DMI), processes this information according to the computed view specification and makes it available to management applications 40 using a distributed computing environment 50. Objects within the management middleware layer 10 can follow the SNMP or OSI structure for management information (in which case they are accessed using the corresponding management protocol), or a proprietary format that exports management services to a legacy distributed computing environment such as CORBA or Java. The model of the present invention only specifies the way that an attribute value is computed from a set of components and for this reason it can be used as an extension to standards-based models for structuring management information such as SNMP, SMI and GDMO. However, the model also fits well with a distributed computing environment such as CORBA, since the notion of computed views for network management is closely related to the notion of higher level management services that can be more efficiently implemented in this framework.

The object-oriented information model is followed so as to allow storage of aggregated management information, as this information model captures in a natural way the types of management aggregations that need to be created and the complex relationships with the information components from which these aggregations are generated.

c. The Aggregation Managed Object

Aggregations (i.e., computed views) are constructed through an information aggregation process applied to management information collected from the network elements at Level 0. Every computed view in the information model framework is stored in an Aggregation Managed Object (AMO) and has one or more of the following components:

1. A monitoring view which contains information that has been collected from the network and processed to represent a higher-level view of the network state;
2. A control view which represents a control interface to higher-level network management services; and
3. An event view, which represents notifications that are generated by the object following the occurrence of a series of other (elementary) events.

In order to define a view, the network manager specifies an aggregation rule with which an attribute value of the view is computed. The aggregation rule can be specified declaratively, in which case a description of the aggregation is provided in a structured language, or explicitly, in which case the manager provides a piece of code that will be executed to compute the attribute's value. The computed attributes are stored within the Aggregation Managed Object and thus represent the network state corresponding to the monitoring and control views.

The Aggregated Managed Objects are stored in the database of a special management agent (the MAVS—Management Aggregation and Visualization Server) which is described in further detail below. AMOs however do not abide to a specific network management standard either in terms of structure or protocol for accessing them. AMOs are distributed between MAVS for scalability, based on a variety of criteria (usually to reduce communication overhead between the AMOs that are heavily interdependent). The distribution of AMOs to MAVS can be independent of the grouping hierarchy shown in the network element grouping model.

Aggregated network management information is contained within every AMO in a list of attributes. Every attribute is associated with a list of groups to determine the information components over which the attribute value is computed. In order to compute the value of the attribute, the list of groups is further expanded into a list of AMOs or pointers to information within element management agents. When the appropriate attribute value from each one of these objects is retrieved, a filter function is applied to calculate the final value. The filter function operates on the collected attribute values and stores the result as the current value of the attribute. For example, the operation SUM sums all the retrieved values and stores the result as the new attribute value. The operation NULL stores all the retrieved values in an array indexed by each retrieved attribute. More complex filter functions may, for example, compute the mean and standard deviation of a distributed data set, extract topological information to create a topology map, etc.

More formally, the attribute value can be expressed using the following formula:

$$V = f\{(G_1 o_1, a_1), (G_2 o_2, a_2), \ldots, (G_n o_{n,} a_n)\} \quad \text{(EQ 1)}$$

where $f$ is the filter function, $G_i$ is a group, $a_i$ is the component attribute's name and $o_i$ is an object selection predicate (i.e., aggregation rule). The latter is used to select the AMOs or MOs within the group from which the attribute value will be collected. Note that an attribute need not be computed exclusively from components of the same type.

Figure 4:
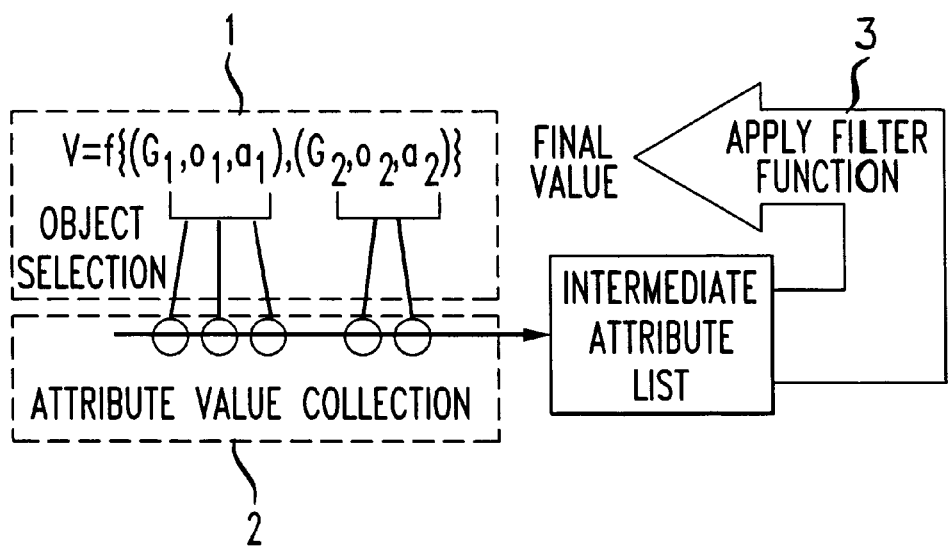
FIG. 4 illustrates a flow chart for a method of computing an aggregated attribute value, according to an embodiment of the present invention.
Figure 5:
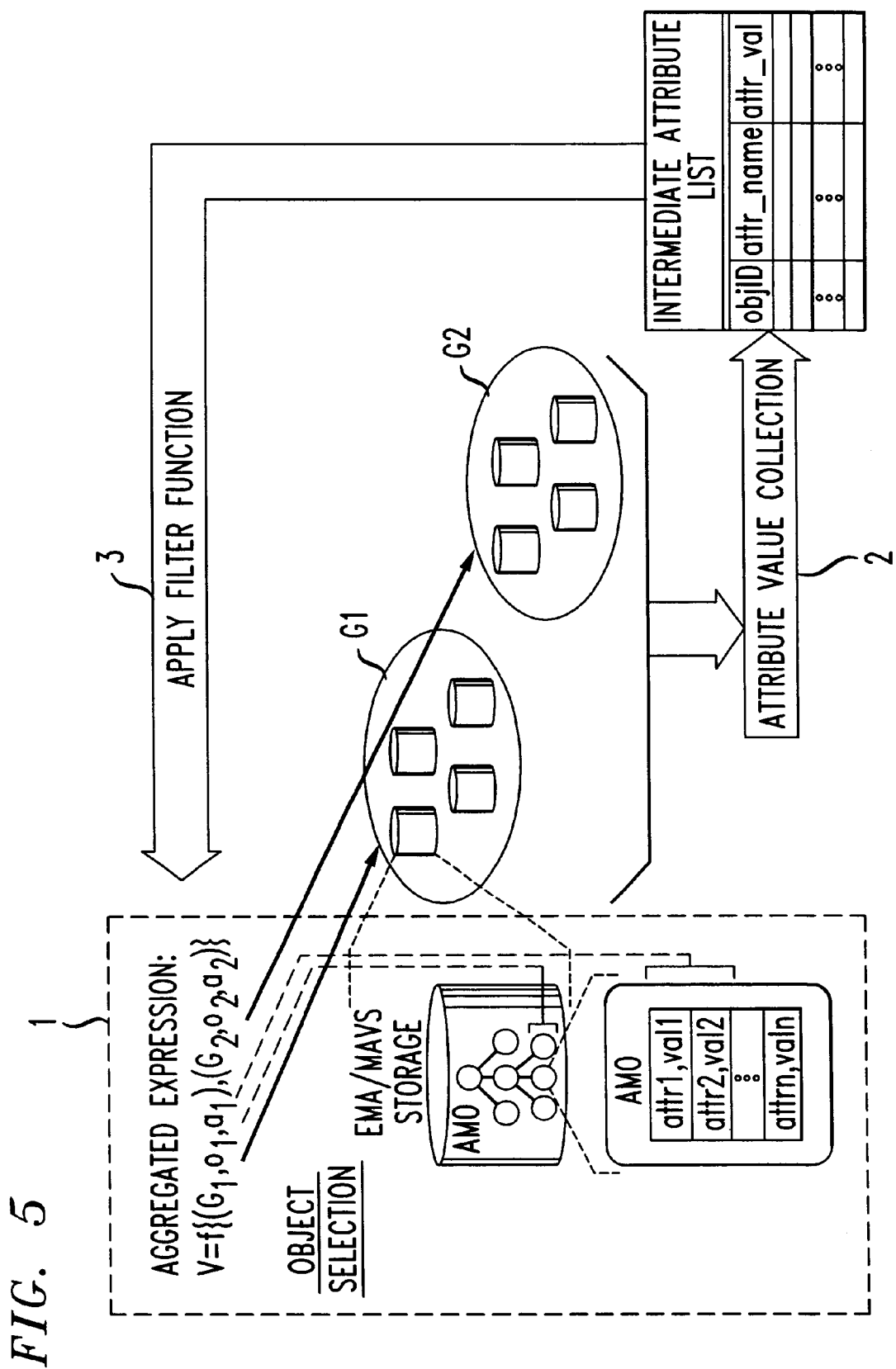
FIG. 5 illustrates another example of the attribute value computation procedure along with a partial apparatus implementation of the Marvel software environment, according to an embodiment of the present invention.

Referring to FIGS. 4 and 5, an example of the attribute value computation procedure is illustrated. In this example, the attribute value V is computed from information components in groups $G_1$ and $G_2$. The procedure works as follows: First, $G_1$ and $G_2$ are resolved into a list of element management agents. For each agent in group $G_1$, the object selection predicate $o_1$ identifies the managed objects that contain the required information. From each such object, we obtain only the values of attributes that correspond to the attribute selection predicate $a_1$. The group $G_2$ is processed similarly. The result of the collection process from all the agents of $G_1$ and $G_2$ is stored in a temporary table structure (i.e., Intermediate Attribute List) that identifies the origin of the attribute, its type and its value. The table is then used as input to the filter function which calculates the new value of V.

Filter functions can be specified by reference, in which case the required code segment is loaded dynamically from an external function library. The benefit of this approach is that library functions need not be integrated with the MAVS, which allows the definition of new functions or the improvement of existing ones without disrupting the operation of the management system.

Thus summarizing, the information model achieves aggregations in a variety of ways. Spatial aggregations of an attribute can be accomplished through grouping and filtering. Temporal aggregations of an attribute, on the other hand, can be accomplished by using special filter functions. For example, a sliding window filter can store a collected attribute value as a time-series. It is also possible to define new attributes using filter functions that operate on the stored time-series such as delta functions, cross-correlation functions, etc. And lastly, Functional aggregations of an attribute can be achieved by combining into a single AMO attributes whose value is computed from a variety of information sources.

For a settable attribute, there also exists a mapping function that describes how the value set by the manager is to be propagated to the underlying components. The simplest mapping function is the one that distributes the same value to all of its component attributes. It can be used for simple on-off operations or control operations that require setting the same value to a group of devices.

A Refresh Policy specifies how the attribute value is computed. Computations may be made either on a synchronous or asynchronous basis. In the synchronous basis the value is computed dynamically upon an operational command or query, such as in a get operation of the attribute's value. In the asynchronous basis, the value is computed and stored according to an update condition. The latter can be a time interval, in which case the value is computed by periodically "pulling" information from the component objects. It is also possible to link the computation of an attribute's value with the occurrence of an event. For example, an event could be an indication that one of the component attributes has changed its value. In an eager policy, the attribute's value is recomputed each time any of its components change. The choice of the update condition must be made with great care: Infrequent updates introduce the danger that the computed information is out of date. On the other hand, an eager policy may trigger very frequent computations of an attribute's value, some of which may not even be necessary (if the value is accessed at slower time scales). The manager sets the update condition taking into consideration the sensitivity of management applications that use this information with regard to its accuracy and the complexity involved in computing its value.

Thus, as can be seen, the amount of management information kept in an AMO is reduced for the following reasons: Firstly, AMO attributes refer to groups of network elements rather than the NEs themselves; Secondly, values are computed by applying a filter function to the collected information; and, Thirdly, AMOs have the capability of evaluating their attribute values synchronously upon a query (i.e., operational command), thereby eliminating the need for storage.

d. Aggregation Managed Object Services

A distributed object services model (i.e., the MAVS described herein below) is used to provide access to the AMOs. Software platforms based on industry standards such as CORBA and Java-RMI are gaining momentum within the network management services industry and can be used to support the present invention's framework. AMOs provide network management services through a set of advertised interfaces. Clients obtain access to these services by contacting a service broker. The broker returns a reference to the AMO that offers the requested service. The client then invokes operations on the AMO directly and receives the results.

AMOs provide two tiers of services: Basic access services, which are mandatory for all AMOs, and Extended Services that are implemented optionally. The latter can be used to provide a richer customized interface to the object for performing more complex operations related to its intended management function. There are three types of basic services:

1. Attribute access services are used to set and retrieve attribute values and control several aspects of every attribute's operation. These functions include get (retrieves an attribute value as an opaque object), set, action (dynamically downloads control logic that operates on one or more attributes or other objects), etc.
2. Visualization services are used to provide clients with the necessary information to setup graphical user interfaces (GUIs) to access the object's basic and extended services. The benefit of this approach is that clients do not need to be aware of an object's internal structure to provide a user-friendly interface. In essence, the GUI is "programmed" as part of the object and is transferred to the client when it first accesses the object. The object may provide more than one visualization services depending on the type of clients that are supported by the Marvel system.
3. Event services are used to subscribe internal and external consumers to receive event notifications generated by the object, and control the event flow. Events in Marvel are usually aggregations of lower-level events corresponding to the management view portrayed by the object.

The AMO designer is responsible for providing an implementation for all basic and extended services. Access to the latter can sometimes be provided indirectly through the basic services. For example, the visualization functions can be overridden to set up a user interface that accesses some of the object's extended services.

In addition to the common services provided by every object, every Marvel server provides a set of high level services that can be used by client applications to navigate and examine the database:

1. Navigation services are used to navigate through the server database and examine its contents. Current Marvel implementations store objects in a tree, and include functions like getRoot (retrieves the root object), getParent (retrieves the parent of an object), getSubordinates (retrieves the object's children), getPath (retrieves the path from the root), etc.
2. Registration services are used to examine the structure and capabilities of every object in the database. In this way, clients can dynamically browse through the services provided by the object and invoke a service with the appropriate parameters. This introspection capability does not require clients to be previously aware of the services provided by every object. Rather, services are "discovered" in real-time and invoked after loading the appropriate stub code at the client. Objects must register themselves when they are created and provide information on the attributes they contain, the extended services they support and the stubs that must be loaded to invoke these services.
3. Object management services are used to instantiate, upgrade or delete objects while the server is running. The manager provides the name of the object to be instantiated, its location in the database and a pointer to the code that can be used to instantiate the object. The server then dynamically loads the code and generates a new object instance. Objects can be upgraded, in which case, the state of the object is frozen, the old code is purged from the agent, the new code is loaded and the captured state is passed to the new object.

The above services can be implemented using industry-standard platforms such as CORBA and Java which are currently being used in many network management applications. Java's remote method invocation (RMI) is a package that provides distributed computing primitives tightly integrated with the language, and is extremely easy to use and integrate into Java applications. CORBA is a more widely accepted standard but requires more heavyweight implementations. The present invention provides the same object services under both frameworks: Java RMI is more suitable for web (and other lightweight) clients, while CORBA for more demanding applications that require the widest possible inter-operability.

e. The Management Aggregation and Visualization Server (MAVS)

Figure 6:
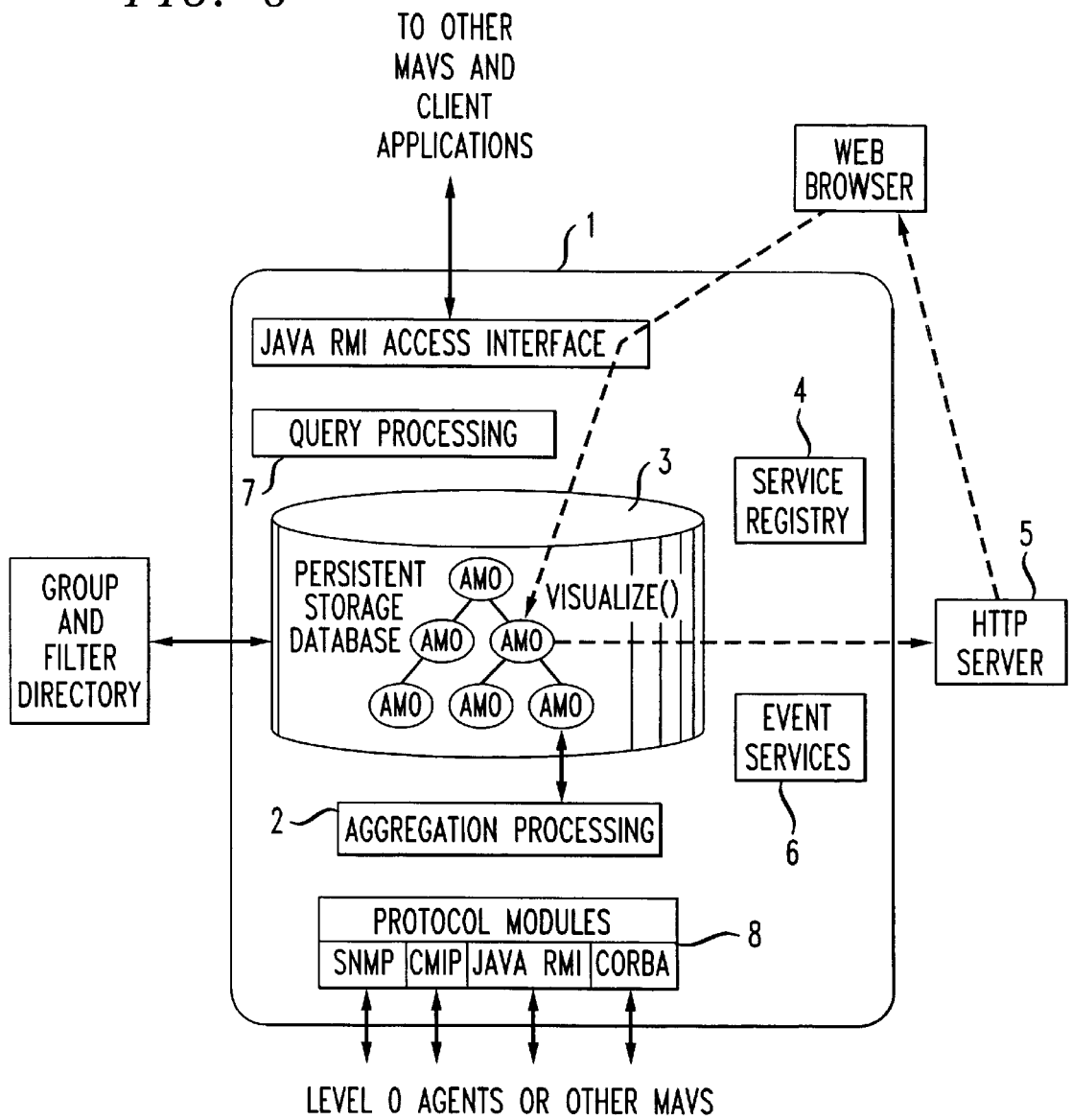
FIG. 6 illustrates an example of the apparatus structure of the Management Aggregation and Visualization Server (MAVS), according to an embodiment of the present invention.

Referring to FIG. 6, the MAVS 1 is a management agent designed to handle aggregations of network management information. Every AMO must be instantiated within a MAVS. For this reason a MAVS has a number of subsystems designed exclusively to support AMO features. Referring again to FIG. 6, its main components are:

1. The aggregation processing engine 2. This engine is responsible for implementing an attribute's update policy by computing its value from a set of components; It initially resolves group references into target objects, invokes the appropriate protocols to collect the necessary information, and finally applies the filter function to compute the final value(s). For control operations the last two tasks are reversed.
2. The persistent storage engine 3. By default, the state of every AMO is made persistent to survive failures of the MAVS. Persistence is necessary when the stored aggregated information cannot be reconstructed from the current contents of element management agents (a time series attribute is a good example of an object that must be persistent).
3. The AMO service registry 4. The registry logs every AMO on the MAVS together with its exported service interfaces (basic and extended). Clients first contact the registry to obtain a handle to their AMO of interest.
4. An HTTP server 5, that provides access to HTML documents generated by some AMO's visualization functions. It also serves to download Java class byte code to clients and provides an initial navigation page to the contents of the MAVS object database.
5. The event processing subsystem 6, that registers event subscriptions and performs event collections and correlations.
6. The query processing engine 7, that supports operations on AMOs with user-supplied predicates and filters (as described above).
7. The protocol translation module 8, which allows AMOs to access management services using a different protocol, such as SNMP, CMIP or CORBA.

A management system based on MARVEL may contain many MAVS. Although it is not required to follow a particular structure, it is usually convenient to structure all MAVS similar to the grouping hierarchy for easier administration, and to minimize communication overheads. So, in a MARVEL system one would expect to have separate MAVS containing the aggregation objects for a particular sub-network, a parent MAVS containing aggregations about a network region (consisting of several sub-networks), and finally a top level MAVS containing the aggregations for the entire network. In reality however, the management system designer can expand or collapse these levels as is necessary. A single MAVS may in fact support any number of levels of aggregation.

AMOs within a MAVS represent aggregations of Levels 1 and above. The MAVS itself acts in a dual role: it acts as a server (agent) for its clients and as a client (manager) when accessing the services of other MAVS or EMAs.

In the current implementation every MAVS contains a number of AMOs in a persistent storage database, very much like the OSI management model. AMOs are placed in a containment tree structure in any fashion that the manager wishes (the tree structure was selected purely for implementation convenience). However, It is often appropriate to follow a natural containment relationship. For example, an AMO representing a summarization of performance parameters from a set of users would be placed as the parent of the AMOs that contain performance parameters of individual users. Note that the structure of the containment tree expresses an arbitrary containment relationship between the AMOs and is not necessarily related to the grouping hierarchy.

Since group definitions and filter functions can be shared between many MAVS, they can be stored in an external directory server. In a way, this directory acts as a central network configuration database. By separating the fairly static configuration information from the MAVS, we avoid synchronization issues when group definitions change. The penalty however is that a directory access is necessary every time a group is resolved into its components.

AMOs are programmed directly in Java. A core class provides the basic management services described above. Every AMO is then subclassed from the parent class and inherits automatically the basic access interface. In addition, the designer can implement the optional extended services by adding new service interfaces. Writing AMOs directly in a programming language has the following advantages:

- The development environment is much simpler since no AMO schema compilers are required (in contrast with the OSI model that uses a GDMO compiler for generating managed objects).
- Some of the default object's functions can be overridden by the programmer to implement, for example, specific data collection and aggregation policies.
- Objects can be extended to provide customized high level services in addition to the fundamental—get/set operations on their attributes.
- The Java runtime system supports dynamic class loading, which allows the integration of new AMO classes and the execution of manager-defined tasks, a capability also known as active management or management-by-delegation.

f. Managed Objects Visualization Model

The MAVS, and the Marvel system in which it resides, was designed under the assumption that the majority of user clients have no prior knowledge of the information stored in Marvel servers and the methods used to access it. This allows clients to rely on the standard features provided by their distributed computing platform to download the necessary code to navigate through the database and to generate a graphical user interface to interact with the Aggregated Managed Objects.

To accomplish this, the Marvel framework requires that every object be able to "visualize" itself by generating a user interface, There may, however, be several ways of visualizing an object depending on the capabilities of the client. For this reason, Marvel supports a small number of visual domains. For every supported visual domain, an Aggregated Managed Object must implement a visualization function capable of displaying the attributes of the object in that domain. For example, a Gopher system would require that the object be converted into a textual representation before it can be displayed. A web-based system would require that every object be converted into an HTML page, and any control actions for the object be implemented through HTML post operations and a CGI interface. Finally, a Java enriched web browser can download Java applets to provide a more interactive interface and use directly distributed computing facilities such as CORBA and Java RMI to access the object's services.

Figure 7:
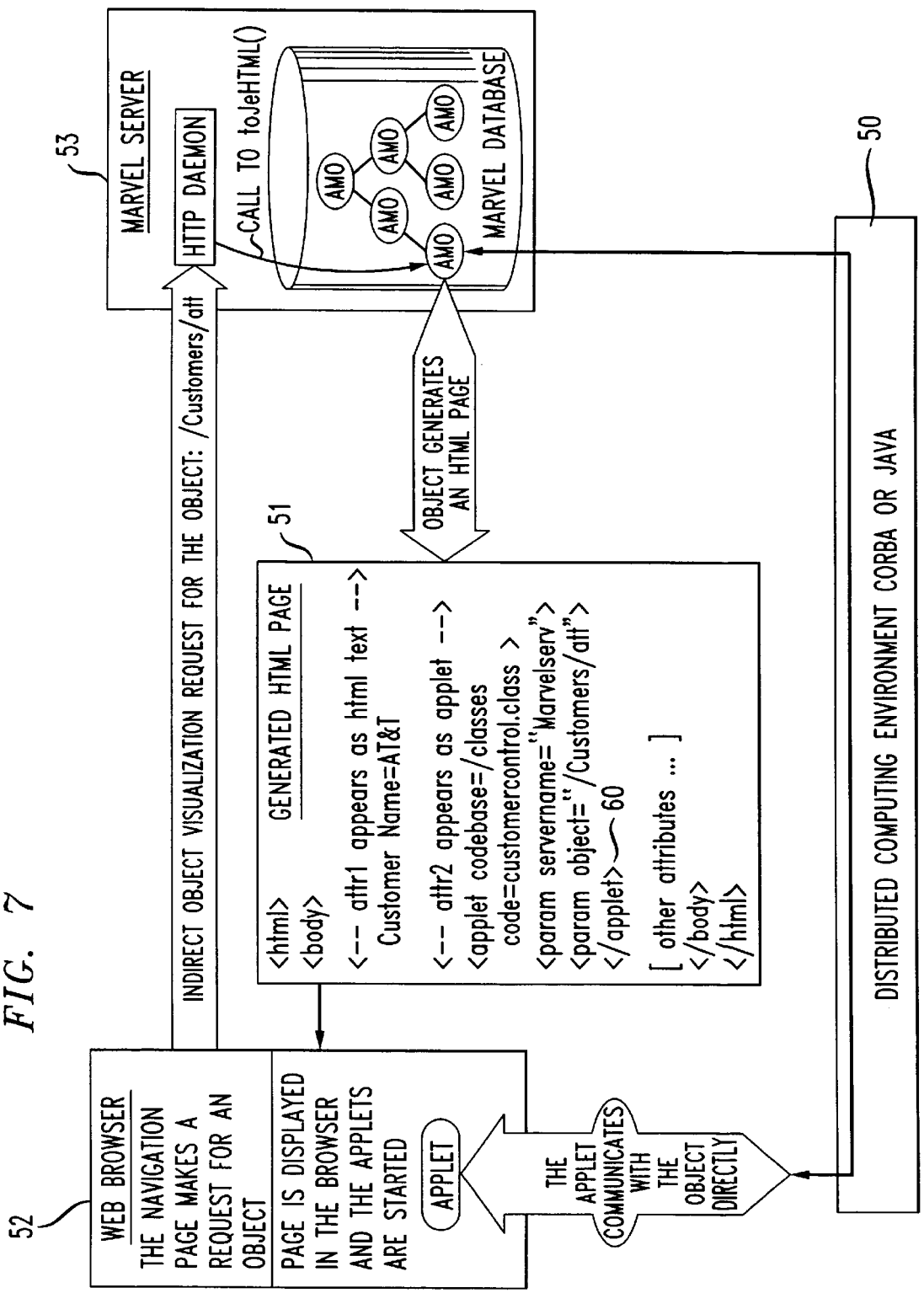
FIG. 7 illustrates an example of an indirect object visualization procedure through an HTTP server, according to an embodiment of the present invention.

The latter visualization technique is of particular interest due to the wide acceptance of the world wide web and Java. As a result, object conversion to Java-enriched HTML is a mandatory service that must be provided by every Marvel object. Referring to FIGS. 6 and 7, the technique works as follows: First, the client invokes the object's toJeHTML() method in one of the following ways:

- by directly invoking the object's method through the distributed computing environment 50, or,
- by indirectly making an HTTP get request supplying the object's name and address. The get request is then translated by the HTTP server 53 to a call to the object's toJeHTML() method, and the results are returned through the HTTP reply.

Second, once the toJeHTML( ) method has been called, the object generates an HTML page 51 that can be viewed by the web browser 52. It does so by generating a default layout for the page, on which the values of the attributes will be displayed. Then, each attribute is instructed to convert itself into a Java-enriched HTML form. Simple data types such as strings and integers need only convert themselves into simple text. More complex data types (especially the ones representing computed views of management information such as tables and time-series graphs) may choose to invoke a Java applet (by inserting the <applet> primitive). The same holds for attributes that represent the object's control capabilities. When the applet is used purely for monitoring purposes, it is possible to supply all the necessary information inside the applet specification block through the <param> primitive. It is also possible to pass to the applet the name and address of the object, in which case the applet can interact with the object directly. This is required for applets that need to perform control operations on the object, or to refresh the displayed information after the page has been loaded.

When the web browser 52 encounters the <applet> block 60 within the html page 51, it attempts to load the applet's code and any other Java classes needed for the applet's operation. Java classes are always loaded from an HTTP server.

As can be seen from above, a network manager can define how management information, collected from network elements, is aggregated into more useful abstractions and finally presented. Thus, as described above, the present invention allows for the automatic aggregation of network management information in spatial, temporal and functional forms, as well as the automatic visualization of the managed objects over the world-wide-web.

In the foregoing description, the method and apparatus of the present invention have been described with reference to a specific example. It is to be understood and expected that variations in the principles of the method and apparatus herein disclosed may be made by one skilled in the art and it is intended that such modifications, changes, and substitutions are to be included within the scope of the present invention as set forth in the appended claims. The specification and the drawings are accordingly to be regarded in an illustrative rather than in a restrictive sense.

What is claimed is:

1. A method for the automatic aggregation of network management information in spatial, temporal and functional forms, the method comprising the steps of:
   specifying at least one group containing at least one of at least one network element and at least one element management agent;
   providing an aggregation rule defining an attribute of at least one of the at least one network element and the at least one element management agent;
   retrieving an attribute value from each one of the at least one network element and the at least one element management agent;
   applying a filter function on the retrieved attribute values to calculate a current value of the defined attribute; and
   storing the current value of the defined attribute.

2. The method according to claim 1, further comprising the step of:
   storing, at least temporarily, the retrieved attribute values in a data-table structure.

3. The method according to claim 2, wherein the data-table structure includes the at least one network element origin of the attribute value, the attribute value name and value.

4. The method according to claim 1, wherein the filter function is specified by reference.

5. The method according to claim 1, further comprising the step of:
   loading the filter function dynamically from an external source.

6. The method according to claim 5, wherein the external source is a filter function data library.

7. The method according to claim 1, wherein the current value of the defined attribute is stored in an Aggregation Managed Object (AMO).

8. The method according to claim 7, wherein an AMO is created from retrieving the attribute values, associated with at least one of at least one network element and at least one element management agent, according to the aggregation rule without restriction to any single group of the at least one group.

9. The method according to claim 1, wherein a spatial aggregation of network management information is achieved by collection of a plurality of attribute values from the at least one network element.

10. The method according to claim 1, wherein the spatial form of an Aggregation Managed Object is achieved by a summarization filter.

11. The method according to claim 1, wherein a temporal aggregation of network management information is achieved by periodic collection of a plurality of attribute values over a length of time.

12. The method according to claim 1, wherein the temporal form of an Aggregation Managed Object is achieved by applying a sliding window filter on the retrieved attribute values.

13. The method according to claim 1, wherein the functional aggregation of network management information is achieved by collecting at least one attribute value from a functional variety of network elements.

14. The method according to claim 1, wherein the functional form of an Aggregation Managed Object is achieved by applying the filter function to the attribute values collected from a functional variety of network elements.

15. The method according to claim 1, wherein the at least one group contains at least one other second group.

16. The method according to claim 1, wherein the current value of the defined attribute is computed dynamically following an operational command to retrieve the attribute value.

17. The method according to claim 16, wherein the operational command is a "get" operation.

18. The method according to claim 1, wherein the current value of the defined attribute is computed on the basis of an update condition.

19. The method according to claim 18, wherein the update condition is one of a time interval and an occurrence of an event.

20. The method according to claim 1, further comprising the step of:
   creating a list of at least one current value of the defined attribute in an Aggregation Managed Object (AMO).

21. The method according to claim 20, wherein the AMO acts as a pointer for retrieval of management information relating to at least one of at least one network element and at least one element management agent.

22. The method according to claim 7, further comprising the step of:
   accessing the AMO through a network service broker.

23. The method according to claim 7, further comprising the step of:

instantiating the AMO within a Management Aggregation and Visualization Server (MAVS).

24. An apparatus for the automatic aggregation of network management information in spatial, temporal and functional forms, the apparatus comprising:

at least one managed element;

a standards based management protocol;

at least one management application;

a distributed computing environment; and a middleware management services layer which extracts the network management information from the at least one managed element using the standards based management protocol, processes in spatial, temporal and functional forms the extracted network management information according to a computed view specification, and makes it available to the at least one management application through the distributed computing environment.

25. The apparatus according to claim 24, wherein the at least one managed element is at least one of at least one network element and at least one element management agent.

26. The apparatus according to claim 24, wherein the standards based management protocol is one of SNMP, CMIP and DMI.

27. The apparatus according to claim 24, wherein the at least one management application is a computer based program through which aggregations of network management information may be retrieved.

28. The apparatus according to claim 24, wherein the distributed computing environment is a computer network.

* * * * *